United States Patent [19]
Nesseth et al.

[11] Patent Number: 5,330,332
[45] Date of Patent: Jul. 19, 1994

[54] MANURE TRANSFER SYSTEM

[75] Inventors: Clifford B. Nesseth; Raymond P. Nesseth, both of Barron; Clinton A. Nesseth, Cameron, all of Wis.

[73] Assignee: NTH, Inc., Barron, Wis.

[21] Appl. No.: 938,877

[22] Filed: Aug. 31, 1992

[51] Int. Cl.⁵ .............................................. F04B 19/22
[52] U.S. Cl. .................................. 417/440; 417/551; 198/532; 198/550.01
[58] Field of Search ............... 417/440, 360, 448, 551, 417/900; 198/532, 550.01, 747; 414/304

[56] References Cited

U.S. PATENT DOCUMENTS

| | | | |
|---|---|---|---|
| 3,981,635 | 9/1976 | Hedlund | 417/551 |
| 4,278,408 | 7/1981 | Rammer et al. | 417/551 |
| 4,293,282 | 10/1981 | Nesseth et al. | 417/551 X |
| 4,440,231 | 4/1984 | Martin | 417/448 X |
| 4,445,823 | 5/1984 | Zyduck | 417/551 X |

*Primary Examiner*—Richard E. Gluck
*Attorney, Agent, or Firm*—Merchant, Gould, Smith, Edell, Welter & Schmidt

[57] ABSTRACT

An improved manure transfer system is disclosed. A collection hopper is located at a first location, preferably within a building, for collecting manure and animal waste products from the building. A piston pump apparatus directs and forces the collected manure through a pump cylinder into a below-grade transfer conduit that carries and deposits the manure through a discharge outlet located at a remote, second location. Means for bypassing the pump piston and cylinder are provided for accessing the transfer conduit enabling safe servicing and maintenance of the system. Isolation means are provided at the conduit discharge outlet for isolating the outlet from accumulated manure at the second location.

32 Claims, 7 Drawing Sheets

MANURE TRANSFER SYSTEM

CROSS-REFERENCE TO RELATED PATENTS

To the extent that the following patents are deemed relevant to a better understanding of this invention, they are herein incorporated by reference: U.S. Pat. No. 3,687,311 to Nesseth entitled Manure Transfer And Storage System; U.S. Pat. No. 3,876,341 to Nesseth entitled Twin Cylinder Pump For Manure Handling System; and U.S. Pat. No. 4,439,115 to Nesseth et al. entitled Manure Transfer System Having A Pull Pump.

FIELD OF THE INVENTION

This invention relates generally to a manure transfer and storage system, and more particularly to an improved configuration for such a system that facilitates maintenance and repair of manure pump portions of such systems and the safe clearing of blockages in the system.

BACKGROUND OF THE INVENTION

Economical, efficient and reliable automated methods of removing liquid and semiliquid manure from barns or other animal housing structures have been the subject of many inventions over the years. Early systems used simple paddle conveyor systems for pushing or pulling the manure at or above ground level out of a building, along gutters or troughs formed in the building floor, or by using belt conveyor-type structures. More recent techniques have found it advantageous to directly pump the manure from a building through underground conduits, to remotely located storage reservoirs or collection sites. Such systems typically utilize collection hoppers located below the building's floor, into which manure and waste from the building's floor is pushed or scraped. Reciprocating hollow piston pumps have typically been used to force the manure from the collection hoppers into the underground conduits, for transport through the conduit to the remotely located collection sites.

The general principles of such manure transfer techniques and a detailed description of a pumping system for accomplishing the transfer is described in U.S. Pat. No. 3,687,311, hereby incorporated by reference to the extent that such patent is needed to provide a background for this invention. The principles broadly described in that patent are still in use today. A number of variations of the basic concept have been configured over the years, primarily with respect to the piston and pump configurations used in such systems. For example, U.S. Pat. No. 3,876,341 describes such a system which utilizes a pair of vertically oriented pumps; whereas U.S. Pat. No. 4,439,115 describes a pump configuration that "pulls" the manure up from the bottom of the collection hopper and into the transfer conduit, rather than pushing the manure downwardly into the conduit.

While each different such system enjoys certain benefits over others, they all share the common principle of using a generally submerged pump cylinder and piston combination that may require repair from time to time. Heretofore, such repair has been very difficult and time consuming since the piston and cylinder are not readily removable from the collection hopper. Further, such removal can be dangerous, as for example, when a piston becomes wedged or stuck in the cylinder which would require removal of both the piston and its associated cylinder from the hopper. Since the pump cylinder in which the piston reciprocates generally has an outlet flapper valve that prevents back-flow of manure through the cylinder and back into the hopper, removal of the cylinder generally eliminates the back-flow safeguard. This can be particularly dangerous in situations wherein a clogged conduit has enabled manure gases within the conduit to create a back-pressure in the conduit, or in cases wherein there is a significant back-pressure head existing in the transfer conduit due to the fact that the manure is being transported and stored to a reservoir that is physically located higher than the conduit and collection hopper assembly. There have been instances in such situations wherein removal of the pump cylinder and piston has enabled back-flow of manure through the system with such force that it has entrapped operators in the collection hopper or caused them to become entangled in the pump assembly, and has resulted in the back-flow of thousands of gallons of material from the storage reservoir, back into the building. Similarly, the existence of pressurized gases within the line can create dangers to an operator, besides posing a problem due to their explosive nature.

Another problem not effectively addressed by prior art systems, is the handling of blockages in the transfer conduit. Such conduits often extend many hundred of feet below grade, and are only accessible through their respective ends. Due to the inconsistency of the manure and waste carried by the conduits, which most often includes straw and bedding material, such foreign materials have a tendency to compress in the transfer conduit when under pumping pressure, and to block the conduit. Such blockage "plugs" of up to 15 feet or more are commonly found. Most often, such blockages occur when there is significant back-pressure from the collection reservoir at the conduit outlet, caused by a relatively filled reservoir. While it is most desirable to empty the reservoir prior to clearing the blockage from the conduit, such emptying is not always possible under winter or severe environmental conditions.

To clear a plug from the line, it is often desirable to inject fluids under high pressure into the line to dislodge or break up the blockage plug. It is generally not feasible to enter the conduit through the storage reservoir discharge end. To be effective, such high-pressure jet should impinge directly upon the plug, which may require insertion of a high-pressure hose and nozzle into the conduit through the piston and cylinder. Such conduit entry through the piston/cylinder negates the back-flow safety feature of the cylinder, since the back-flow valve of the cylinder is held open by the hose running therethrough. If the system does not have an effective back-flow valve at the discharge end of the conduit, or if the discharge end is stuck open, once the plug is dislodged with the high-pressure jet, there is no means for preventing free back-flow from the reservoir, through the conduit and open cylinder/piston, back into the building.

Another tendency of such manure pump and transfer systems is their tendency to collect sediment and residue in the transfer conduit leading from the pump to the remotely located storage reservoir. Since such systems necessarily have slow flow rates of material through the conduit, sediment can collect relatively quickly, and provide restriction or blockage problems to the system. Other than for the same technique used with blockages, of feeding a high-pressure line through the pump/cylinder assembly and down through the line to flush the system, prior art systems do not provide any effective means for flushing such residue from the manure transfer line.

This invention addresses the above-described shortcomings of prior art systems. The unique system configuration of this invention allows back-pressure to be relieved within the transfer conduit and for ease of removal of material from the conduit so that the pump piston and cylinder can be accessed and/or safely removed for repair. The present invention also enables for high-pressure flushing of sediment from the conduit or for removing blockage plugs, without disabling the back-flow safety features of the pump cylinder mechanisms. As will become apparent upon a more detailed description of the present invention, such features and benefits are provided for manure pumps and systems of varied designs and configurations.

SUMMARY OF THE INVENTION

The present invention provides a unique system housing configuration that enables operative access into the transfer conduit, at a position therealong that lies beyond the discharge end of the pump's piston travel, and beyond the back-flow prevention safeguards of the piston's cylinder. Such operative access to the transfer conduit permits the pump's piston and associated cylinder to be bypassed for either reverse removal of waste material and built-up gases from the conduit, or for forward flushing of sediment through the conduit or for high-pressure erosion of blockage plugs.

According to one aspect of the invention, there is provided an improved manure transfer system for transferring manure or the like from a first location to a remote second location which includes:

A. collection means at the first location for collecting and holding the manure;
B. conduit means operatively connected with the collection means for transferring manure to a remote location and through an outlet of the conduit;
C. pump means operatively connected relative to the collection means and the conduit means for pumping manure normally in one direction from the collection means through the conduit; and
D. maintenance means independent of the pump means, for enabling repair and maintenance of the pump and conduit including:
  i. valve means operatively connected with the conduit for preventing back-flow of manure through the conduit when the pump structure is removed from its operative connection with the collection means; and
  ii. bypass access means operatively connected to the conduit means for providing access to the conduit means at a position intermediate the valve means and the conduit outlet, to permit pressure relief for the conduit and bidirectional pumping of material within the conduit.

The present invention is particularly suitable for manure transfer systems having hopper-like containers suitable for mounting below floor level of a building, which are designed to collect manure by gravity flow, and for such systems having a pump with a piston that is mounted for reciprocal movement relative to the conduit inlet, for pumping manure from the hopper and into the conduit. According to a preferred embodiment of the invention, the maintenance means includes a valve configuration which automatically closes back-flow through the conduit whenever the pump cylinder is removed from the collection hopper. The invention also contemplates the use of a mechanism for forcing the maintenance valve closed in the event that it should become stuck in an open position. According to a preferred embodiment of the invention, the maintenance bypass access means comprises an access conduit extending into the transfer conduit at a position just past the maintenance valve and the pump cylinder, and upwardly to a readily accessible position near the top of the collection hopper which is normally above the level of standing manure collected by the collection means. The access conduit is closed by means of a cap and pressure relief means for relieving accumulated pressure in the conduit through the cap. The access conduit of the present invention is sized and configured to enable appropriate high-pressure injection hoses or liquid removal hoses to be inserted therethrough into the transfer conduit for pumping fluid into or out of the conduit. The invention also includes isolation means operatively connected to the conduit means adjacent its discharge outlet for isolating the outlet from fluid communication with previously discharged material so that access can be gained to the conduit through its discharge port even though it may be lower than the general level of waste material collected within the collection reservoir.

According to yet another aspect of the invention, there is provided such a bypass access means for providing access to a manure transfer conduit from the collection hopper by bypassing the pump piston/cylinder mechanism in a manure transfer system of the type having a collection hopper defining an open upper end suitable for receiving manure falling by gravity therethrough, conduit means having an inlet operatively connected and fluid communication with the collection hopper for transferring manure from the hopper to a remote second location, and pump means having a movable member at least partially operable within the collection hopper for forcing manure from the hopper through the inlet and into the conduit.

According to yet another aspect of the invention, there is provided an improved collection hopper apparatus for manure transfer systems of the type designed to collect manure at a subfloor collection location and to transfer collected manure through a conduit to a position remote from the collection location, which includes:

A. an outer wall configuration extending between an upper end defining a receiving port for accepting manure falling by gravity therethrough, and a lower end suitable for retainably collecting the manure entering the receiving port wherein the outer wall defines a pump access port therethrough;
B. pump receiving means continuously extending outwardly from the outer wall configuration at the pump access port for cooperatively receiving a pump housing member and outwardly extending a distance sufficient to fully accommodate a pump housing member and any movable parts thereof and terminating at a discharge port sized and configured for continuous operative connection with a transfer conduit;
C. a bypass access conduit operatively extending between the outer wall configuration adjacent its upper end and the pump receiving means adjacent the discharge port thereof, forming an open fluid flow path therebetween; and D. closure means for selectively sealing said bypass access conduit at its outer wall end.

According to yet further aspect of the invention, there is provided outlet isolation means for use in combination with a manure transfer conduit having an outlet end for dispensing manure pumped through the conduit into a collection reservoir, comprising:
  A. a closure valve operatively connectable to the conduit adjacent its outlet end for preventing fluid flow back into the conduit through the outlet while enabling normal fluid discharge out of the outlet; and
  B. enclosure means operatively connectable to the conduit for enclosing the outlet end of the conduit on all but the top end thereof; for isolating the outlet end from fluid communication with previously dispensed manure which is at the same physical level or at a level higher than that of the outlet port.

According to a preferred embodiment of this aspect of the invention, the outlet isolation means includes a box-like enclosure extending upwardly from the conduit outlet port to an open upper access port. Another feature of this aspect of the invention includes means for moving the closure valve to an open position which does not impede the flow of material from the conduit outlet port through the open upper access port of the enclosure.

While the present invention will be described with respect to a particular pump system and pump configuration, it will be understood that the invention is not limited to the use of either the particular pumping system or type of pump described. Similarly, while the invention will be described with respect to a system having a particular hopper configuration and to such a system wherein the pump cooperates with the hopper configuration in a given manner, the invention is not limited to such hopper or pump interrelation configurations. Further, while the invention will be described with respect to a preferred embodiment placement of the maintenance gate or valve, it will be understood that such specific placement or specifics of the gate configuration are not limiting to the invention. Similarly, while the invention will be described with respect to a preferred embodiment bypass access conduit configuration, such preferred embodiment is not to be construed in a limiting manner on the scope of the invention. Also, while the invention is described with respect to its applicability for transferring manure, it will be understood that it is equally applicable to the movement of other slurry-type materials as well, which generally have the same consistency as animal waste manure. These and other variations of the invention will become apparent to those skilled in the art upon a more detailed description of the invention.

BRIEF DESCRIPTION OF THE DRAWING

Referring to the figures, wherein like numerals represent like parts throughout the several views.

DETAILED DESCRIPTION OF THE INVENTION

Figure 1A:
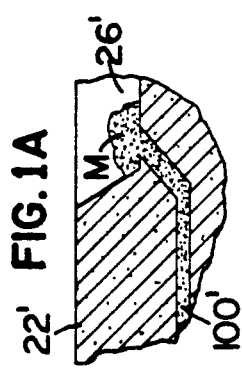
FIG. 1A is a diagrammatic representation of an alternate outlet discharge technique for the manure transfer system otherwise illustrated in FIG. 1.
Figure 1:
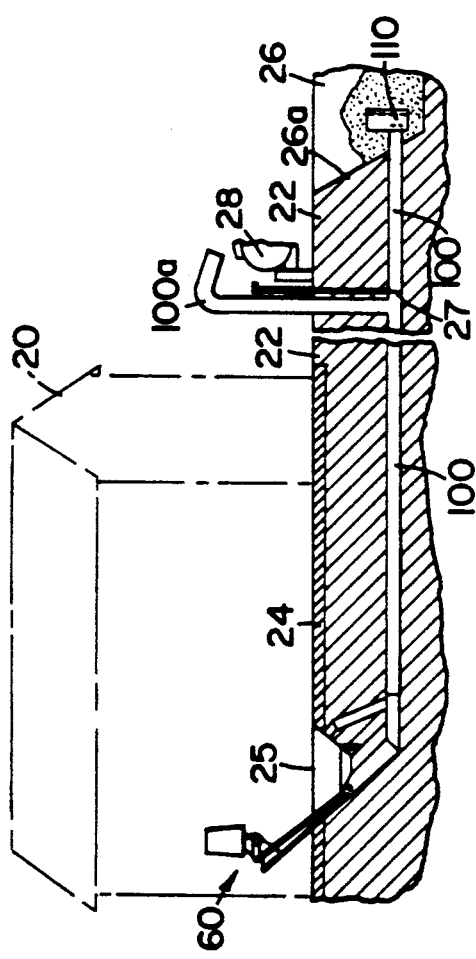
FIG. 1 is a diagrammatic representation of a preferred embodiment configuration incorporating the manure transfer system of this invention.

Referring to the Drawing, there is generally illustrated in FIG. 1, a diagrammatic representation of how a manure transfer system incorporating the principles of this invention might be configured in a typical application thereof. A fragmentary portion of a barn or other similar building for enclosing or housing animals, is indicated at 20. The ground or surface upon which the barn rests is generally indicated at 22. The cement floor of the barn is generally indicated at 24, and is also configured to mount and support the pump and hopper apparatus of the present invention. In the preferred embodiment of the invention, the manure collection hopper portion of the invention is generally indicated at 40. In the preferred embodiment, the manure collection hopper is illustrated as being formed in the ground below the level of the building floor 24 to ease the task of loading manure into the hopper 40. As will be appreciated by those skilled in the art, however, the collection hopper 40 need not necessarily be located below the floor level. In the preferred embodiment, at least the lower portion of the collection hopper 40 is constructed of metal, which is embedded within poured cement, to form an immovable solid configuration. It will be understood by those skilled in the art, however, that the collection hopper need not be formed of metal, but could also be made entirely of cement or other appropriate material suitable for the purposes to which it will be put. The collection hopper 40 is illustrated as lying below and in alignment with a grate or grid 25 in the building floor, which allows manure and waste products to fall by gravity therethrough into the collection hopper 40. In common practice, troughs and collection assemblies in barns are typically aligned with the grate 25 such that waste materials from the barn can be automatically moved along the collection troughs and into the hopper 40—as is well-known in the art.

In general, a pump assembly, generally illustrated at 60 in FIG. 1 forces manure collected in the collection hopper into a manure transfer conduit, generally illustrated at 100 which is buried in generally horizontal manner below the surface of the ground 22 for carrying the pumped manure to remote collection sites in a manner as described in more detail in U.S. Pat. No. 3,687,311, herein incorporated by reference. In general, the transfer conduit 100 may extend directly through the sidewall 26a of a collection reservoir 26. The collection reservoir or pit 26 generally has a concrete or other liquid and nutrient impervious lining for preventing seepage or leeching of the liquid manure discharged into the reservoir, into the surrounding and underlying soil. The transfer conduit 100 typically enters a collection reservoir 26 at a position along the sidewall 26a which is several feet above the bottom of the reservoir. Such location prevents the discharge outlet of the conduit from becoming readily clogged, and is low enough in cold climates to enable the conduit to generally remain covered by the manure residue in the reservoir, to prevent freezing of material within the transfer conduit.

The conduit 100 may also branch off to permit dispersion of the materials carried thereby to other locations, such as to a spreader loading station (generally indicated by the spreader 28). In such applications, the manure flow within the transfer conduit 100 is redirected through the vertical discharge line 100a by means of a direction control valve generally illustrated at 27, or by other suitable means well-known in the art.

Alternatively, when the consistency of the manure or waste carried by the transfer conduit is relatively high (as compared to that of a slurry), the discharge output of the transfer conduit can be directed upwardly through the bottom of the reservoir (as illustrated in FIG. 1A) to form a stacked pile or mound of pumped material. In such cases, reservoirs having retaining sidewalls may not even be necessary, and the thick consistency material may simply be collected on stacking slabs.

An apparatus for isolating the discharge outlet end of the transfer conduit 100 is generally illustrated at 110, and will be described in more detail hereinafter.

Figure 2:
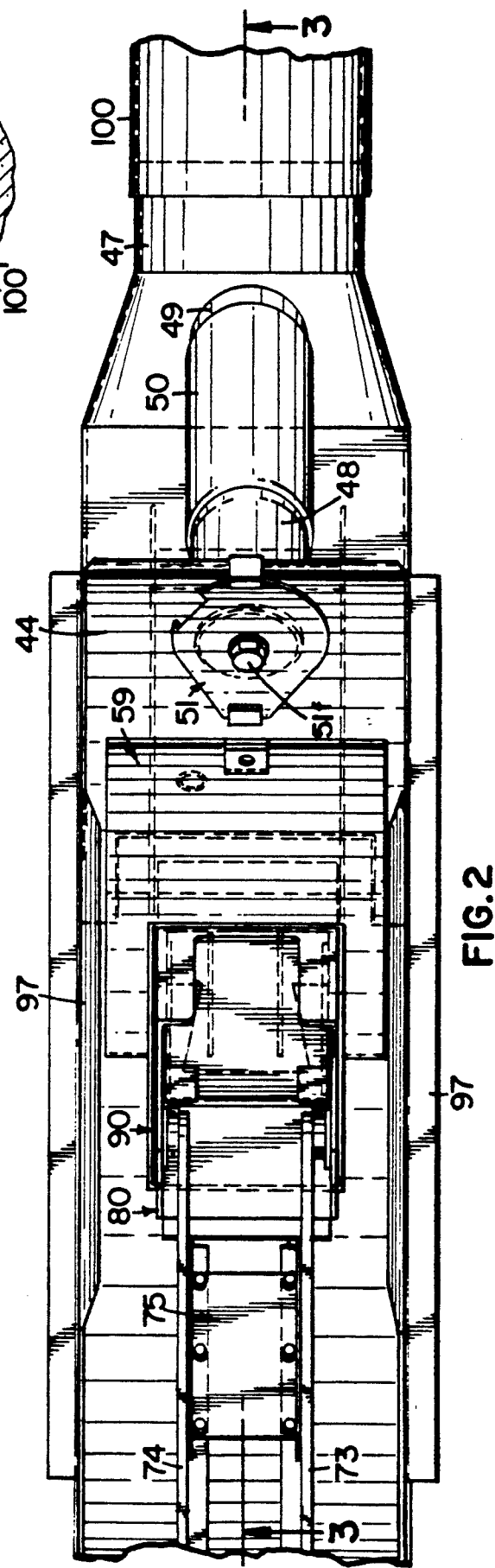
FIG. 2 is a top plan view of the collection hopper and lower pump assembly portions of the system disclosed in FIG. 1.
Figure 3:
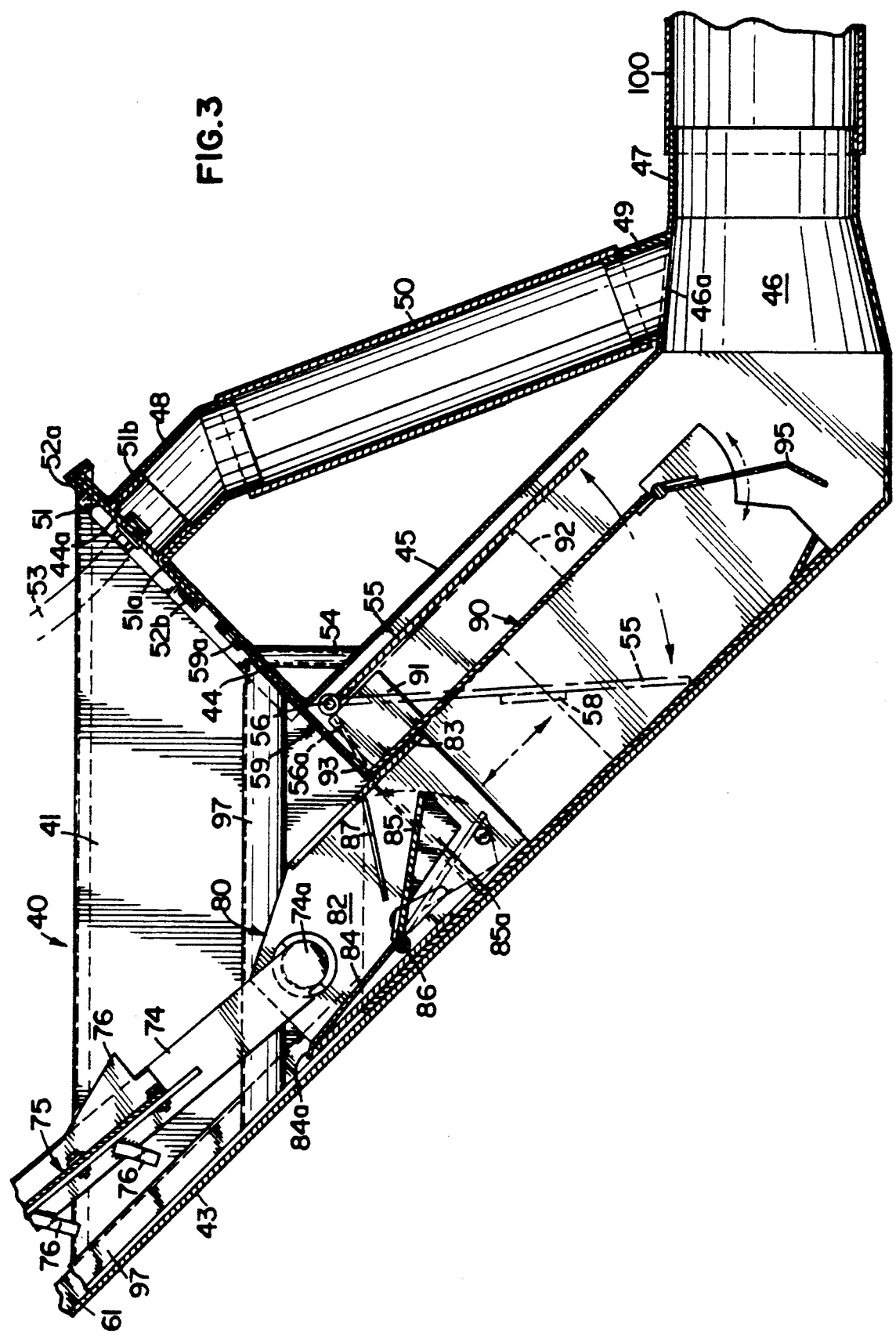
FIG. 3 is a cross-sectional view taken generally along the Line 3—3 of FIG. 2, illustrating the hopper, cylinder and piston portions of the pump assembly of FIG. 2.

Referring to FIGS. 2–10, the pump assembly and hopper portions of a preferred embodiment manure transfer configuration which practices the principles of this invention, are disclosed. Referring thereto, the manure collection hopper 40 includes a pair of spaced apart sidewalls 41 and 42 which are vertically disposed and converge toward each other in the downward direction. As illustrated in FIGS. 2 and 3, the manure collection hopper 40 further includes a back wall 43 and a front wall 44. The back wall 43 also forms the bottom of the collection hopper 40 and generally extends into a rectangular cylinder receiving chamber generally indicated at 45, forming a continuous extension of the sidewalls 41 and 42 and the back and front walls 43 and 44 respectively. The cylinder receiving chamber 45 defines a rectangular cross-section inner chamber for cooperatively receiving a pump cylinder, as hereinafter described in more detail. The sidewalls 41 and 42 and the back and front walls 43 and 44 respectively collectively form an outer wall configuration for the collection hopper 40. The upper perimeter or edge of such outer wall configuration collectively define an upper access port for receiving manure therethrough, which falls by gravity into engagement with the outer walls and is directed in funnel-like manner toward the cylinder receiving chamber 45. The rectangular opening into the cylinder receiving chamber 45 will be generally referred to as the pump access port. The cylinder receiving chamber 45 extends downwardly and distally outwardly from the outer wall configuration (as illustrated in FIG. 3) and converges through a reduction section 46 at its distal end to a round collar section 47 defining a discharge port for the cylinder receiving chamber 45. The cylindrical transfer conduit 100 cooperatively engages and is secured to the cylindrical collar 47 of the cylinder receiving chamber, thereby forming a continuous closed path from the hopper 40, through the cylinder receiving chamber 45 and into the transfer conduit 100. The sizes of the cylinder receiving chamber, and the transfer conduit 100 vary, depending upon the particular application. Common diameter dimensions for the transfer conduit are 12-inch or 15-inch piping.

Besides defining the pump access port 45a, the front wall 44 of the collection hopper 40 defines an upper opening 44a therethrough, located adjacent the upper edge of the front wall 44. A cylindrical collar 48 projects outwardly from the back of the front wall 44, as illustrated in FIG. 3. The reduction extension 46 of the cylinder receiving chamber 45 also defines a generally circular opening 46a in its upper surface. A cylindrical collar member 49 is secured to the outer surface of the reduction portion 46, forming an access port to the interior of the reduction portion 46. A cylindrical conduit 50 is operatively connected at its opposite ends to the collars 48 and 49. The passageway formed by the opening 44a, the collars 48 and 49, the conduit 50 and the opening 46a defines a bypass access passageway between the collection hopper 40 and the internal cavity of the reduction member 46, which forms the entrance port to the transfer conduit 100.

Figure 12A:
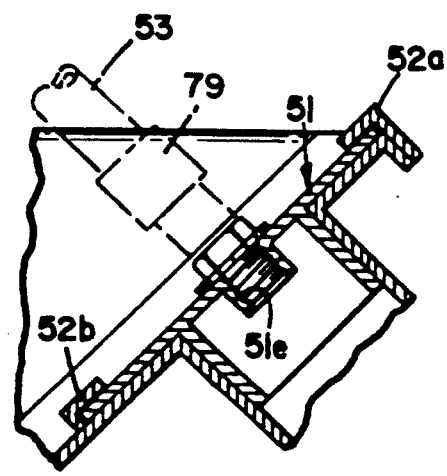
FIG. 12A is a diagrammatic cross-sectional view of the retainer cap structure of FIG. 9 illustrating connection of a pressure relief valve to the cap structure.
Figure 12B:
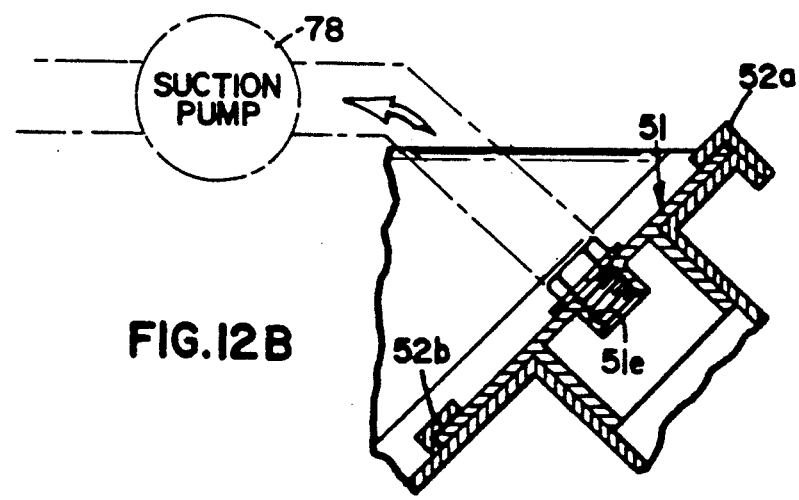
FIG. 12B is a diagrammatic cross-sectional view of the retainer cap structure of FIG. 9 illustrating connection of a suction pump to the cap structure.
Figure 12C:
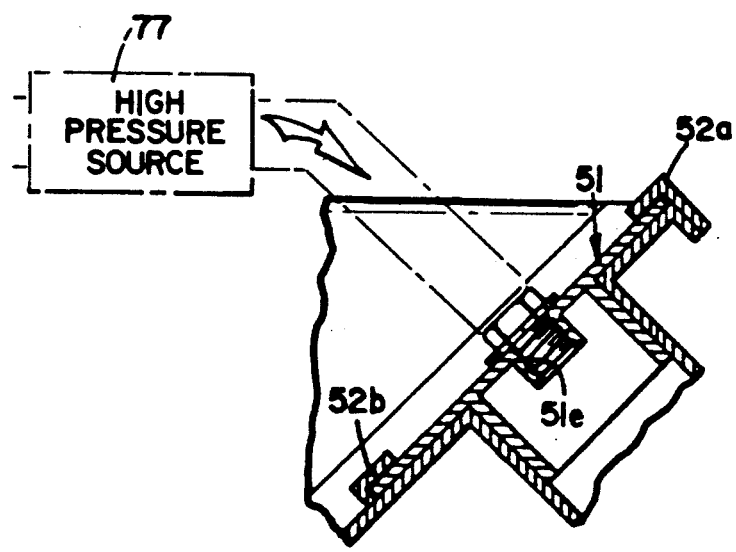
FIG. 12C is a diagrammatic cross-sectional view of the retainer cap structure of FIG. 9 illustrating connection of a high pressure fluid source to the cap structure.

The entrance 44a to the bypass access passage is closed by means of a cap member 51. In the preferred embodiment, the cap 51 includes an outer plate 51a welded to a cylindrical collar 51b. The collar 51b is sized to cooperatively snugly slide within the inside of the cylindrical collar 48 to a position wherein the back surface of the outer plate 51a cooperatively engages the forward face of the front wall 44, as illustrated in FIG. 3. The outer periphery of the plate 51a is cam-shaped and includes a notch 51c. Upper and lower L-shaped cap retaining brackets 52a and 52b respectively project outwardly from the front wall 44 for slidably engaging and retaining the cap member in place within the upper collar 48. To insert the cap member within the opening 44a, the cap is rotated until the notch 51c cooperatively aligns with the upper bracket 52a. In such position, that edge of the cap disposed exactly opposite of the notch 51c will clear the lower bracket 52b such that the collar portion 51b of the cap 51 can be slidably inserted through the opening 44a and into the collar 48. When fully inserted such that the back surface of the cap 51 engages the outer surface of the front wall 44, the cap is rotated in a counterclockwise direction to the position illustrated in FIG. 9 such that the upper and lower brackets 52a and 52b will retainably hold the cap in closed position over the opening 44a. An O-ring seal (not illustrated) around the periphery of the opening 44a provides a tight seal between the cap 51 and the wall 44 and/or collar 48. A front tab member 51d acts as an engagement lever for facilitating rotation of the cap 51 within the collar 58 for insertion and removal purposes. The cap plate 51a includes a circular threaded opening 51e into which can be threaded a plug member, illustrated at 51f in FIG. 1 or a hose (illustrated at 53 in phantom in FIGS. 3 and 9). The hose 53 can be connected to a pressurized source of water or the like illustrated at 77 in FIG. 12C for injecting fluid flow into the bypass access passageway, or to a suction pump illustrated at 78 in FIG. 12B for removing material from the bypass access conduit. Alternatively, an appropriate pressure relief valve illustrated at 79 in FIG. 12A can be threaded into the hole 51e. As will become apparent to those skilled in the art, once pressure is relieved within the bypass access passageway, the cap member 51 can be removed from the hopper to expose the full diameter of the opening 44a for insertion therethrough of a larger hose for pressure injection into the conduit 100 or, alternatively, pumping of material from the conduit 100.

Figure 7:
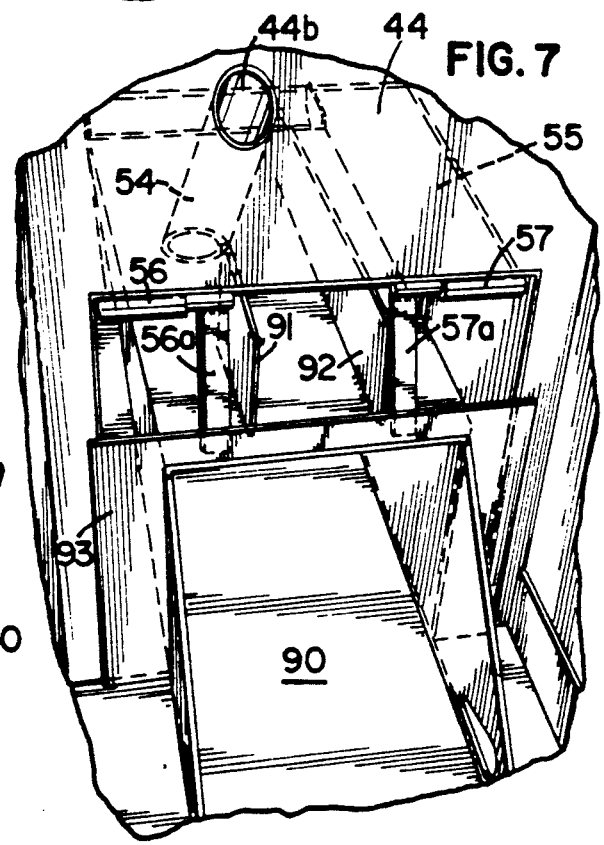
FIG. 7 is an enlarged fragmentary perspective view looking down into the hopper, and pump assembly with the front lower hopper door member and piston removed from the pump cylinder.
Figure 9:
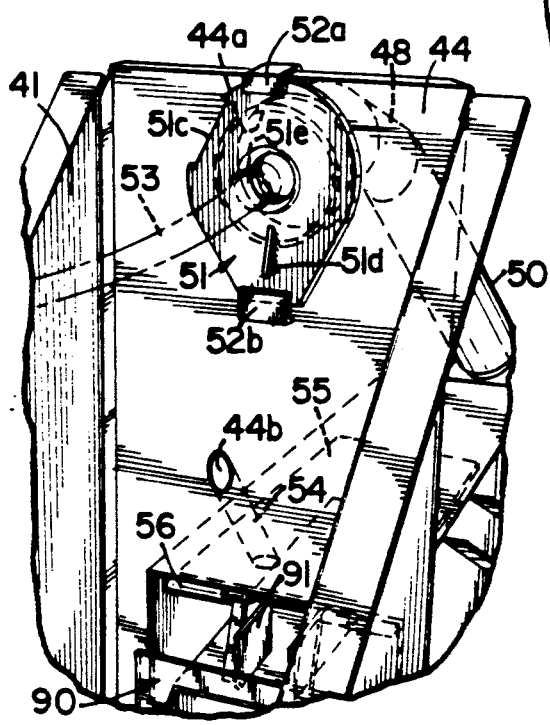
FIG. 9 is an enlarged fragmentary view of the retainer cap enclosure for the bypass access port portion of the invention illustrated in FIGS. 2 and 3.
Figure 10:
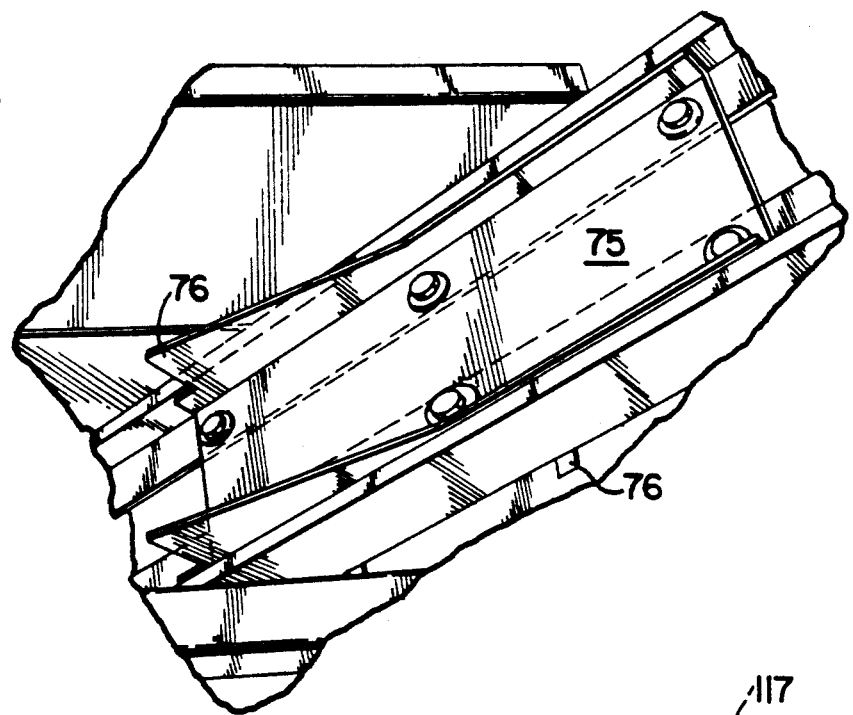
FIG. 10 is an enlarged fragmentary perspective view of the connecting driver rod and rod spreader portions of the pump assembly of FIG. 2.

A third hole 44b is formed in the front wall 44 and is continuously connected by means of a conduit 54 which opens into the cylinder receiving chamber 45 at a position slightly spaced back from the pump access port 45a so as to overlie a gate or flapper member 55. The conduit 54 is of relatively small diameter, and is operable to guide a push-rod (not illustrated) therethrough from the collection hopper 40 for pushing the gate 55 to a closed position, if necessary. The gate 55 is hingedly connected to the sidewalls of the cylinder receiving chamber 45 adjacent the top of the pump access port 45a by means of a pair of hinges 56 and 57. The pin members of the hinges 56 and 57 respectively include handle portions 56a and 57a which retainably hold their respective hinge pins in operative position when a cylinder (hereinafter described) is inserted within the cylinder receiving chamber, and which are used to facilitate removal of the hinge pins when it is desired to remove the gate 55 from the hopper assembly. A pair of stop members 58 project from the inner sidewalls of the cylinder receiving chamber 45 for engaging the gate 55 when it is disposed in its lower, closed position (as illustrated in FIG. 7), for preventing back-pressure against the gate 55 from warping or wedging the gate within the cylinder receiving chamber 45. The gate 55 is pivotally movable about its axially aligned hinges 56 and 57 to a lower position to close back-flow through the cylinder receiving chamber 45, thereby preventing flow back through the pump axis port 45a, and to an upper, open position (as illustrated in FIG. 3) wherein the gate 55 lies generally parallel to the upper surface of the cylinder receiving chamber 45.

A front wall plate member 59 is sized to cover the upper portion of the pump access port 45a which is not filled by the pump cylinder (hereinafter described in more detail). The plate or door member 59 provides closure for the rod access opening 44b and the conduit 54, and includes an upper handle portion 59a for enabling the plate 59 to be grasped and removed from the hopper assembly.

The pump assembly of the invention is generally illustrated at 60 in FIG. 1. The back/lower wall 43 of the collection hopper 40 extends rearwardly and is inclined at an upward angle toward the building floor 24, terminating at an upper end generally designated at 43a. A pair of oppositely oriented channel iron support members 61 and 62 provide rigidity for the extended back wall 43 between its upper end 43a and the sidewalls 41 and 42 of the collection hopper. The uppermost ends of the channel irons 61 and 62 define bearing surfaces 61a and 62a, described in more detail hereinafter. The channel iron 61 and 62 and lower wall 43 assembly provide a mounting and guide base for components of the pump assembly, as hereinafter described. A pair of pump drive assembly mounting brackets are secured to the lower wall 43 and channel iron 61 and 62 assembly adjacent the upper end 43a of the wall 43 for mounting the drive components for the pump assembly 60. The mounting brackets 63 include a plurality of anchor stud portions 63a which are embedded within a concrete support foundation for the system, providing a solid support base for the pump drive assembly components. The upper portions of the mounting brackets 63 are slightly raised from the general plane of the lower wall 43, to enable ready insertion and manipulation of bolts between the upper portions of the bracket and the lower wall 43, for anchoring pump drive assembly components to the bracket.

The pump drive assembly components generally include a gear box assembly 64 which is directly mounted to the mounting brackets 63. A motor mounting frame 65 is secured to the top of the gear box assembly 64 and at an orientation which lies generally parallel with the building floor 24 and carries a motor 66. A motor cover 67 is also mounted to the motor mounting frame 65 in overlying relationship with the motor 66 to protect the motor. In the preferred embodiment, the motor 66 is a 10-horsepower electric motor and the gear box assembly 64 is a reduction gear assembly of a type manufactured by Browning. It will be understood, however, that many variations of the pump drive assembly components can be envisioned within the spirit and intent of this invention.

Figure 4:
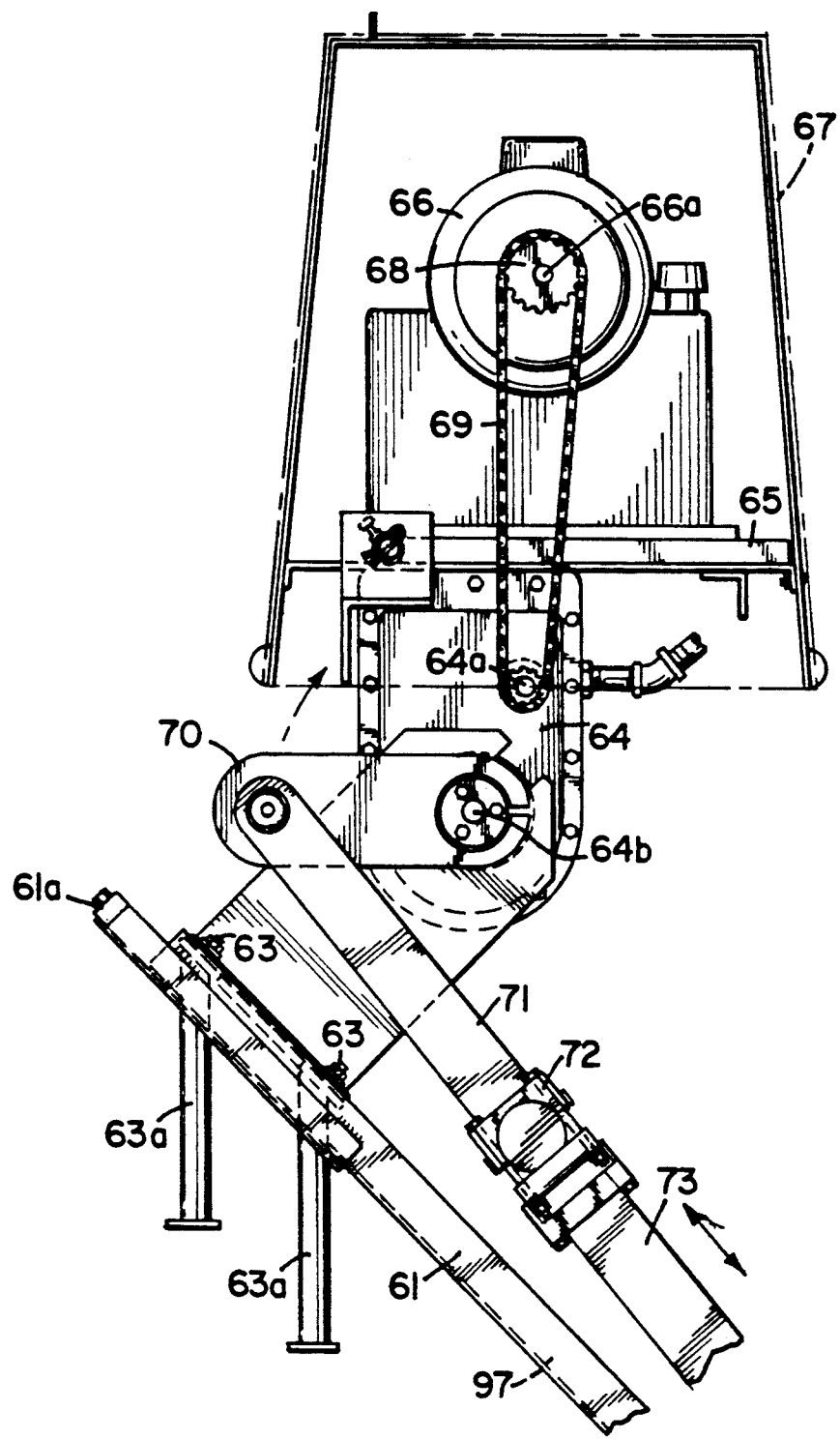
FIG. 4 is a side elevational view illustrating the upper motor control and connecting rod portions of the pump assembly portions of FIG. 1.

The output shaft 66a of the motor drives a pulley 68 connected by means of a belt 69 to rotate an input drive shaft 64a of the gear box assembly 64. The output drive shaft 64b of the gear box assembly 64 is connected to a pair of drive arms 70, one located on each end of the output drive shaft 64b. A pair of yoke arms 71 (only one of which is illustrated in FIG. 4) are connected to the drive arms 70. The yoke arms 71 in combination with the drive arms 70 convert the rotational output motion of the output drive shaft 64b into reciprocal longitudinal motion for driving the piston of the pump assembly (as hereinafter described). A tool bar 72 laterally extends between the yoke arms 71 at their distal ends and provides a mounting bracket for the upper end of a pair of connecting rod members 73 and 74. The lower, forward ends of the connecting rods 73a and 74a include cylindrical bearing studs projecting from their outwardly directed surfaces for cooperatively pivotally engaging a piston 80. The lateral spacing of the connecting rods 73 and 74 is maintained by means of a spreader plate 75 which is fastened to the connecting rods once they have been operatively engaged to the piston 80. Each of the connecting rods 73 and 74 has, in a preferred embodiment, a plurality of rake members 76 extending both in the upward and downward directions from the connecting rods to urge straw and other matter down into a slurry contained in the hopper container, as the rod members reciprocate back and forth through the slurry, as is well-known in the art. Details of the general drive assembly for a piston pump are not provided herein, since it is assumed that those skilled in the art are knowledgeable of the various configurations of such systems that can be used. For a more detailed description of such systems, the reader is referred to the cross-referenced patents and the technical literature of manure pump systems produced by such companies as N-Tech of Barron, Wis., which, for example, sells such a system under its Super Magnum Piston Pump label.

The piston 80 is, in the preferred embodiment, a hollow body type piston of a configuration well-known in the art, which contains a pair of sidewalls 81 and 82 interconnected by top and bottom walls 83 and 84 respectively. The sidewalls include cylindrical bearing support collars sized and configured to matingly receive the cylindrical stud portions of the front ends 73a and 74a of the connecting rods 73 and 74. The bottom wall 84 contains a downwardly depending lip 84a at its rear edge The top wall 83 is notched to provide a substantially open upper wall. A movable gate or flapper member 85 is pivotally connected to the sidewalls 81 and 82 for pivotal motion along an access 86 extending along its lower edge. A pair of restraint tab members 87 are secured to the inner surfaces of the sidewalls 81 and 82 to provide engaging support for the gate 85 when pivoted to a closed position. A gate or flapper member 85 is pivotally movable between a "closed" position when in engagement with the tab restraint members 87, and an "open" position when it is resting against the bottom 84 of the piston 80. A pair of triangular riser members 85a extending from the lower surface of the gate 85 provide added rigidity to the gate member and enable the general plane of the gate member to be disposed slightly at an angle with respect to the bottom of the piston when the gate is positioned in an "open" position.

The piston 80 is configured for cooperative slidable movement within a piston cylinder 90, as illustrated in FIG. 3. The cylinder 90 generally comprises a rectangular sleeve structure for insertion within the cylinder receiving chamber 45, and provides a precision cylinder and wear surface for guiding reciprocal movement of the piston 80 therein. The piston of the preferred embodiment includes a pair of upward projections 91 and 92 longitudinally extending along the cylinder's upper wall. The projections serve to retainably hold the pins of the hinges 56 and 57 in place, by preventing the handle portions 56a and 57a thereof from moving in the longitudinal directions of the pins (see FIG. 8). The projection member 92 extends significantly along the length of the cylinder 90, and operatively engages and opens the gate 55 as the cylinder is inserted into the cylinder receiving chamber 45, and retainably holds the gate 55 in such open position as long as the cylinder 90 remains in the cylinder receiving chamber 45. The cylinder 90 includes an outer flange or collar member 93 which extends along the sides and top portions of the cylinder for cooperatively engaging the front wall 44 of the collection hopper 40 when the cylinder 90 is inserted within the cylinder receiving chamber 45 (see FIG. 8). The space between the upper surface of the cylinder and the upper portion of the pump access port 45a is closed by means of the plate or door member 59, which snugly fits and rests against the front wall 44 and between the front wall and the upper portion of the cylinder collar or flange 93 (see FIG. 6). The rearward portions of the cylinder sidewalls project outwardly from the flange 93 and into the collection area of the hopper 40 for guiding movement of the piston as portions thereof leave the inner cavity portion of the cylinder (see FIG. 3). The rearward extending portions of the cylinder sidewalls include holes for enabling grasping and removal of the cylinder from the cylinder receiving chamber 45. A cylinder flapper valve 95 is hingedly connected adjacent the forward end of the cylinder 90 for pivotal motion between "open" and "closed" positions. When in a closed position, the cylinder flapper valve 95 prevents material back-flow from the transfer conduit 100 and back through the cylinder 90.

Figure 6:
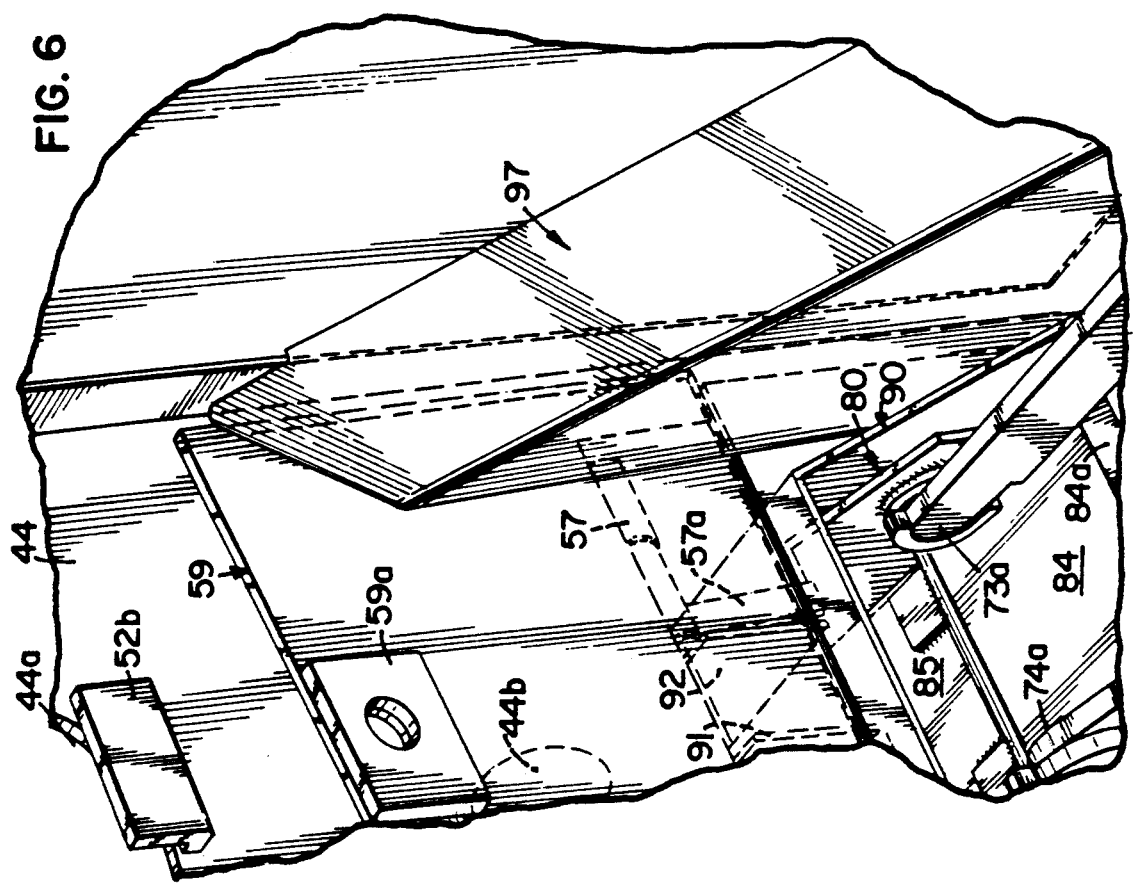
FIG. 6 is an enlarged fragmentary perspective view looking down into the lower right portion of the hopper portion of the system of FIGS. 1-3, illustrating the rear portions of the pump cylinder and piston portions thereof.
Figure 5:
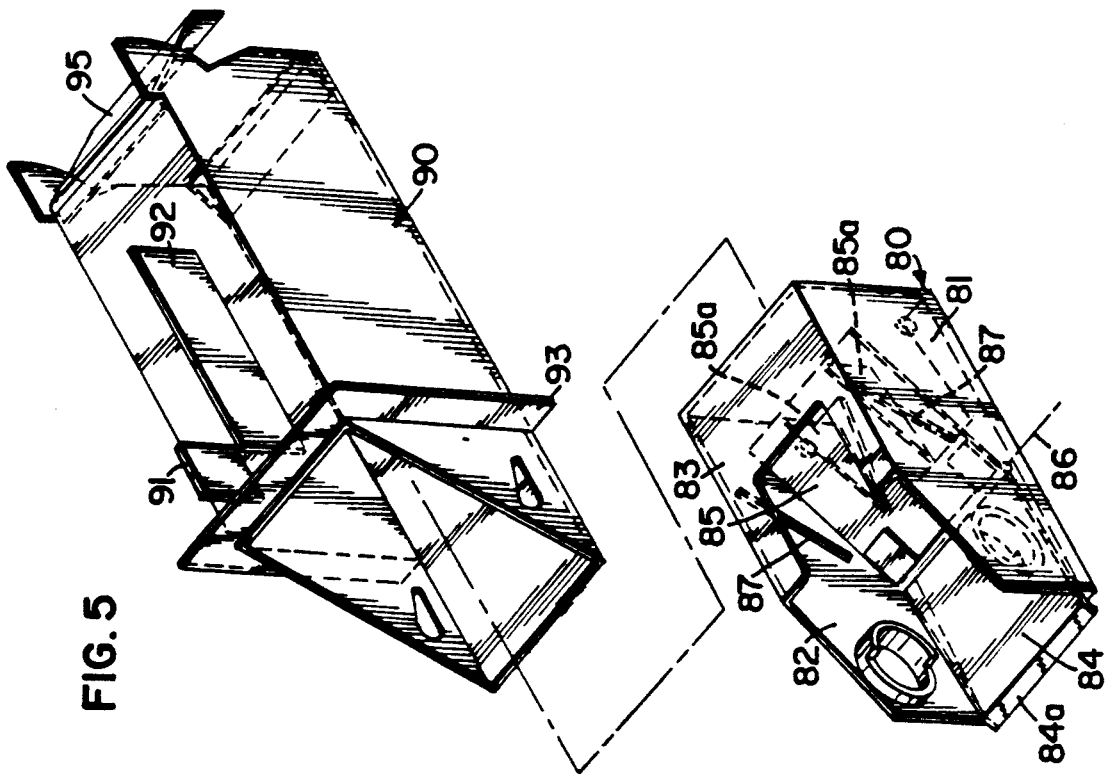
FIG. 5 is an exploded perspective view of the piston and cylinder portions of the pump assembly disclosed in FIGS. 2-3.
Figure 8:
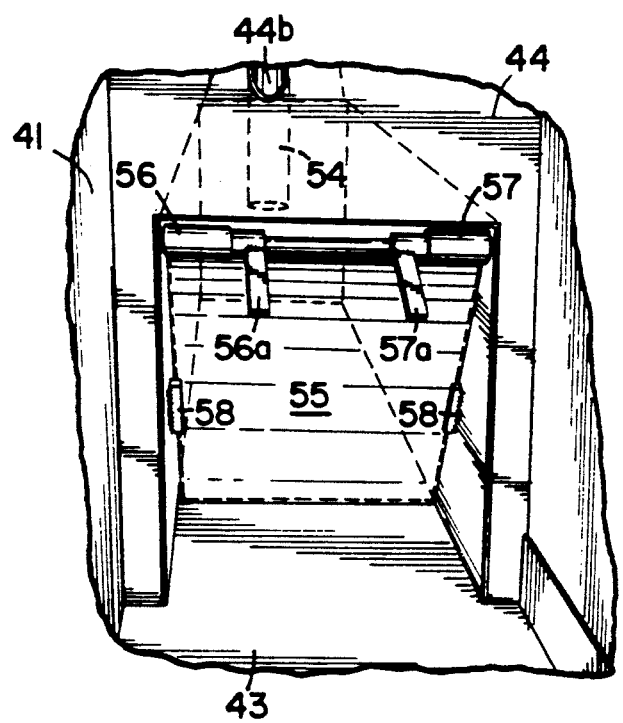
FIG. 8 is an enlarged fragmentary perspective view looking down into the hopper, as in FIG. 7, with the pump cylinder removed and illustrating the maintenance gate assembly in closed position.

The door member 59 and the cylinder 90 are firmly held in place, when in operative position as illustrated in FIG. 6, by means of a pair of oppositely disposed hold-down plates 97 and 98. The hold-down plates 97 and 98 extend from a front edge, which engages the door member 59 and the flange 93 of the cylinder, and rearward along the support channels 61 and 62 of the lower wall 43 to its upper end. The upper ends of the hold-down plates 97 and 98 are retainably engaged by appropriate fastening means against the bearing surface members 61a and 62a respectively to provide firm engagement pressure against the door member 59 and the cylinder 90.

The principles of operation of the piston pump assembly above-described, are well-known in the art, and will not be belabored herein. In general, the piston 80 is reciprocally longitudinally movable within the piston cylinder 90, as moved by the connecting rods 73 and 74. On its "forward" stroke, the piston gate 85 pivots upwardly to its closed position, to force a charge of manure before it through the piston cylinder 90 and into the transfer conduit 100. On its back or "return" stroke, suction of manure within the transfer conduit and cylinder 90 will cause the piston gate 85 to move to its open position and will also close the flapper door 95 at the discharge port of the cylinder 90, enabling a fresh charge of manure to flow through the hollow piston body and into the inner cavity of the cylinder 90, for discharge by a subsequent forward stroke of the piston.

When the cylinder 90 is removed from the cylinder receiving chamber 45, the gate 55 will pivot to its closed position, preventing back-flow of manure through the cylinder receiving chamber 45 and into the collection hopper 40. In the event that the gate 55 remains stuck in its "open" position, it can be forced down into its closed position by insertion of a rod through the conduit 54 and by applying pressure to the back or upper surface of the gate 55.

Convenient bypass access to the transfer conduit 100 is provided by means of the bypass access passage. Such access can be provided through the smaller hole 51e in the cap member 51, or through the larger access opening 44a when the cap 51 is removed. Such access enables ready flushing of the transfer conduit 100 without disturbing the piston and cylinder assemblies, and also enables cleaning and plug dissolving capabilities for the system, without requiring insertion of hoses or the like through the piston and cylinder assemblies. The bypass access passageway also provides for controllable release of built-up gas pressures within the transfer conduit 100 as, for example, may be experienced when there is a blockage in the transfer conduit.

Figure 11:
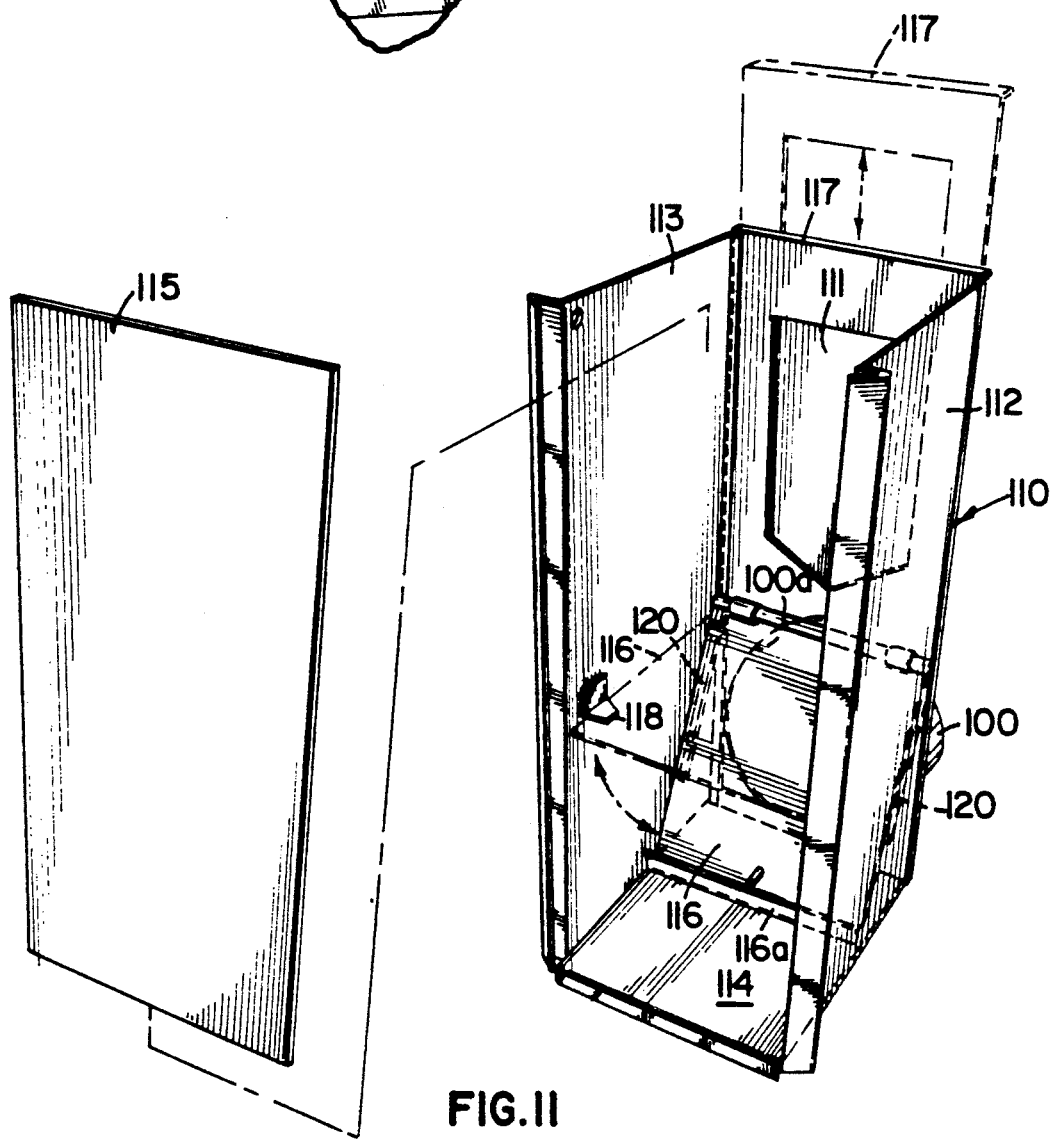
FIG. 11 is an exploded perspective view of the isolator apparatus located at the outlet of the system, illustrating the front panel as removed and illustrating in phantom how the door/flapper portion thereof would be moved and lifted relative to the assembly.

Piston pump systems for transferring manure, of the type generally described above, typically include a back-flow gate or valve at the discharge outlet end of the transfer conduit 100. The present invention includes an improved structure for isolating the discharge output of the transfer conduit so that the system can be safely repaired and the transfer conduit possibly emptied, even though the level of manure within the collection reservoir is higher than the level of the outlet discharge port opening into the reservoir. A preferred embodiment of such an isolation means is generally illustrated at 110 in FIG. 11. Referring thereto, the discharge outlet end of the transfer conduit 100 is generally indicated at 100b. An isolation chamber 110 generally includes a back wall 111, a pair of sidewalls 112 and 113, and a lower wall 114—all interconnected to form a box-like structure as illustrated in FIG. 11. The forward edges of the sidewalls 112 and 113 each defines a receiving channel for cooperatively accepting in sliding engagement a front wall panel 115 that is removable from the isolation assembly 110. The front and back walls 115 and 111 and the sidewalls 112 and 113 in cooperation with the lower wall 114 define a box-like isolation cavity which has an open top for providing access to the transfer conduit 100. A back-flow preventing flapper valve 116 is pivotally mounted to a plate member 117 sized and configured for slidable insertion within a pair of grooves located along the back inner edges of the sidewalls 112 and 113. The flapper 116 is pivotally movable between a lower (closed) position as illustrated in FIG. 11 to close back-flow into the transfer conduit 100, and to an upper (open) position as restrained by the stop member 118 on the sidewall 113, to permit flow of material out of the transfer conduit 100. The lower edge of the flapper member 116 is rounded upward at 116a to prevent catching of the flapper on a hose or the like which may be inserted through the transfer conduit for maintenance purposes. The side edges of the flapper 116 are supported when in its closed position by means of a pair of support tabs 120. The back wall 111 has a circular opening formed therethrough through which the outlet end of the transfer conduit passes. The isolation apparatus is sealably connected to the transfer conduit by means of the back wall 111.

In normal operation of the manure pump system, the front wall panel 115 of the isolation assembly 110 is removed from the assembly to permit free movement of manure exiting the discharge outlet 100b of the transfer conduit 100 into the collection reservoir 26. Under such conditions, the plate member 117 and its associated flapper 116 are positioned in the "down" position as illustrated in solid lines in FIG. 11. In the event that it is desired to isolate the discharge port 100b of the transfer conduit 100 from the surrounding manure within the reservoir 26, the front wall 115 is slid into operative position relative to the sidewalls 112 and 113, to isolate the discharge port from the surrounding manure within the collection reservoir. Free access through the discharge port 100b of the transfer conduit 100 can then be achieved by simply lifting the rear plate member 117 in the vertical direction, thereby removing the flapper valve 116 from overlying engagement with the outlet port 100b of the transfer conduit. The transfer conduit can then be pumped, or otherwise accessed as desired through its discharge port without concern for backflow from the general mass of material of the collection reservoir.

While the present invention has been described with respect to its application as illustrated in a preferred embodiment, it will be understood that a number of variations of the embodiment can be configured within the spirit and intent of the invention. The invention is not intended to be limited in scope to any particular type or style of piston pump assembly or to any particular hopper collection configuration. This description is intended to provide a specific example of one embodiment which clearly discloses the present invention. All alternative modifications and variations of the invention which fall within the broad scope of the appended claims are covered.

What is claimed is:

1. An improved manure transfer system for transferring manure or the like from a first location to a remote second location, comprising:
   (a) collection means at said first location for collecting and holding manure or the like;
   (b) conduit means operatively connected with said collection means, for transporting manure held thereby to a remote location; said conduit means defining an outlet through which the transported manure is discharged;
   (c) pump means operatively connected relative to said collection means and said conduit means for pumping manure normally in one direction from said collection means and through said conduit means;
   (d) maintenance means independent of said pump means, for enabling repair and maintenance of said pump means and said conduit means, comprising:
      (i) valve means operatively connected with said conduit means for closing back-flow of manure through said conduit means when said pump means is removed from said operative connection; and
      (ii) bypass access means operatively connected to said conduit means for providing access to said conduit means at a position intermediate said valve means and said conduit outlet; whereby said access means permits pressure relief of and bidirectional pumping of material to and from said conduit means.

2. The improved manure transfer system of claim 1, wherein said collection means comprises a hopper-like container suitable for mounting below floor level of a building within which it is mounted, and having an open upper end for receiving manure that falls by gravity therethrough; and wherein at least a portion of said conduit means is configured for mounting below grade, wherein manure pumped from said hopper-like container travels to said conduit outlet at least in part, below grade.

3. The improved manure transfer system of claim 1, wherein said conduit includes an inlet at said collection means; and wherein said pump means includes piston means mounted for reciprocal movement relative to said conduit inlet for pumping manure from said collection means and through said inlet into said conduit means.

4. The improved manure transfer system of claim 3, wherein said piston comprises:
   (a) a hollow piston body having an open top end and an open rear end; and
   (b) a gate pivotally mounted on said body and alternately operatively movable between opened and closed positions across the hollow piston body in response to rearward and forward reciprocal movement respectively of said piston body in its longitudinal direction; whereby said piston urges manure from said collection means into said conduit inlet when said gate is disposed in said closed position and enables manure to flow through said piston body when said gate is disposed in said open position.

5. The improved manure transfer system of claim 1, wherein said conduit includes an inlet opening into said collection means; wherein said valve means is disposed adjacent said inlet and is operable between open and closed positions to respectively permit and prevent material flow through said inlet.

6. The improved manure transfer system of claim 5, further including means cooperatively engaging said valve means for maintaining said valve means in its said open position whenever said pump means is operatively connected relative to said collection means and said conduit means.

7. The improved manure transfer system of claim 6, wherein said means for cooperatively engaging said valve means is operative to enable said valve means to move to its said closed position when said pump means is removed from its operative position relative to said conduit means.

8. The improved manure transfer system of claim 7, further including means cooperatively aligned with said valve means for enabling forcible movement of said valve means to its said closed position in the event said valve means becomes stuck in its said open position.

9. The improved manure transfer system of claim 8, wherein said means for enabling forcible movement of said valve means comprises a tube extending from said collection means to said conduit means at a position overlying said valve means sized and configured to enable a rod to be guided therethrough for pushing said valve means to its said closed position.

10. The improved manure transfer system of claim 1, wherein said bypass access means comprises:
(a) a second conduit extending between first and second ends, said first end being operatively connected in fluid communication with said conduit means at a position intermediate said valve means and said conduit outlet and said second end thereof opening into said collection means at a height above the normal level of manure collected by said collection means;
(b) cap means closing said second conduit at said second end thereof; and
(c) pressure relief means in said cap means for relieving accumulated pressure in said conduit means through said second conduit.

11. The improved manure transfer system of claim 10, further including second pump means operatively connected with said second conduit for pumping material from said conduit means downstream from said valve means.

12. The improved manure transfer system of claim 10, further including high pressure pump means operatively connected with said second conduit means for injecting a high pressure stream of liquid into said conduit means, for dislodging blockages within said conduit means.

13. The improved manure transfer system of claim 1, wherein said bypass access means is sized and configured to enable a length of hose to be inserted therethrough for extension into said conduit means to pump fluid into said conduit means or to pump fluid out of said conduit means.

14. The improved manure transfer system of claim 1, further including second valve means operatively connected with said conduit means at its outlet for preventing back-flow of fluid through said outlet back into said conduit.

15. The improved manure transfer system of claim 1, wherein said conduit means discharges its contents into a reservoir of discharged material, and further including isolation means operatively connected to said conduit means adjacent its outlet for isolating said outlet from fluid communication with said discharged material which may surround or be at a level higher than said conduit outlet; whereby open access to said conduit means through said outlet is enabled even if the physical level of said discharged material in said reservoir is higher than that of the conduit outlet.

16. The improved manure transfer system of claim 15, wherein said isolation means comprises a box-like configuration operatively connected with said conduit means and extending upwardly therefrom at said outlet, said box-like configuration having an open upper end.

17. The improved manure transfer system of claim 16, wherein said isolation means further includes a removable side panel oppositely disposed from the outlet of said conduit, wherein material flowing out of said conduit outlet passes unimpeded through said isolation means when said removable side panel is removed.

18. The improved manure transfer system of claim 14, wherein said conduit means discharges its contents into a reservoir of discharged material, and further including isolation means operatively connected to said conduit means adjacent its outlet for isolating said outlet from fluid communication with said discharged material which may surround or be at a level higher than said conduit outlet; whereby open access to said conduit means through said outlet is enabled even if the physical level of said discharged material in said reservoir is higher than that of the conduit outlet.

19. The improved manure transfer system of claim 18, wherein said second valve means forms a part of said isolation means; and wherein said isolation means is configured such that said second valve means can be physically moved to an open position without impeding flow of material from said conduit outlet and through said isolation means.

20. System maintenance means for use in combination with a system for transferring manure from a first location to a remote second location of the type having: a collection hopper defining an open upper end suitable for receiving manure falling by gravity therethrough; conduit means having an inlet operatively connected in fluid communication with said collection hopper, for transferring manure from said hopper to said second location; and pump means having a movable member at least partially operable within said collection hopper for forcing manure from said hopper and through said inlet into said conduit means; comprising: bypass access means for providing access to said conduit from said collection hopper by bypassing said pump means; said bypass access means comprising a second conduit extending between a first end operatively connected to said conduit means at a position slightly downstream from said conduit inlet and beyond operable components of said pump means, and a second end disposed above that portion of said collection hopper that normally contains and holds collected manure; whereby working access to said conduit means downstream from said inlet is provided through said bypass access means independent of said pump means or said conduit inlet.

21. The apparatus of claim 20, wherein said bypass access means includes closure means at said second end, normally sealably closing said second end; said closure means including means for relieving pressure from said second conduit and said conduit means without requiring opening of the entire cross-section of said second conduit at said second end.

22. The apparatus of claim 21, wherein said second conduit is sized and configured to enable a length of hose to be inserted therethrough for extension into said conduit means to pump fluid into said conduit means or to pump fluid out of said conduit means.

23. The apparatus of claim 20, further including means operatively mounted adjacent said conduit inlet for preventing back-flow of manure through said inlet and into said collection hopper when said pump means is operatively removed from said collection hopper.

24. The apparatus of claim 20, wherein said conduit means defines an outlet port through which its contents is discharged at said second location; and wherein said apparatus further includes isolation means operatively connected to said conduit means adjacent said outlet port for isolating said outlet port from fluid communication with the main body of material previously discharged through said outlet port at said second location, which material may surround or be at a level higher than said outlet port; whereby open access to said conduit means through said outlet port is enabled even if the physical level of said previously discharged material is higher than that of the conduit outlet port.

25. The apparatus of claim 23, wherein said conduit means defines an outlet port through which its contents is discharged at said second location; and wherein said apparatus further includes isolation means operatively connected to said conduit means adjacent said outlet port for isolating said outlet port from fluid communication with the main body of material previously discharged through said outlet port at said second location, which material may surround or be at a level higher than said outlet port; whereby open access to said conduit means through said outlet port is enabled even if the physical level of said previously discharged material is higher than that of the conduit outlet port.

26. The apparatus of claim 24, wherein said isolation means further includes second valve means operatively connected at said outlet port of said conduit means for preventing back-flow of material discharged through said outlet port back into said conduit means.

27. The apparatus of claim 26, wherein said second valve means is movable relative to said isolation means such that the second valve means can be moved to a position whereby material discharged from said conduit means flows into and out of said isolation means without restriction from said second valve means.

28. An improved collection hopper apparatus for manure transfer systems of the type designed to collect manure at a sub-floor collection location and to transfer collected manure through a conduit to a position remote from the collection location, comprising:

(a) an outer wall configuration extending between an upper end defining a receiving port for accepting manure falling by gravity therethrough, and a lower end suitable for retainably collecting the manure entering said receiving port; said outer wall configuration defining a pump access port therethrough;

(b) pump receiving means continuously extending outward from said outer wall configuration at said pump access port, for cooperatively receiving a pump housing member; said pump receiving means extending distally outward from said outer wall configuration a distance sufficient to fully accommodate a pump housing member and extension of any movable parts thereof, and terminating at a discharge port sized and configured for continuous operative connection with a transfer conduit;

(c) a bypass access conduit operatively extending between the outer wall configuration adjacent its upper end and said pump receiving means adjacent said discharge port thereof, forming an open fluid flow path therebetween; and (d) closure means selectively sealing said bypass access conduit at its said outer wall configuration end.

29. The improved collection hopper apparatus of claim 28, wherein said closure means includes means for relieving pressure from said bypass access conduit.

30. The improved collection hopper apparatus of claim 28, wherein said bypass access conduit is sized and configured to enable a length of hose to be continuously fed therethrough for pumping fluid in either direction therethrough.

31. The improved collection hopper apparatus of claim 28, further including gate means operatively connected within said pump receiving means for preventing back-flow through said pump access port if a pump housing member is not operatively present within said pump receiving means.

32. The improved collection hopper apparatus of claim 31, further including a supplemental conduit extending between said hopper outer wall configuration and said pump receiving means at a position therealong which generally overlies said gate means when disposed in an open position to permit fluid flow through said pump receiving means; said supplemental conduit being sized and configured to enable a push rod to be guided therethrough for pushing said gate means to a closed position in the event said gate means becomes stuck in its open position.

* * * * *

UNITED STATES PATENT AND TRADEMARK OFFICE
CERTIFICATE OF CORRECTION

PATENT NO.    : 5,330,332
DATED         : July 19, 1994
INVENTOR(S)   : Nesseth et al.

It is certified that error appears in the above-identified patent and that said Letters Patent is hereby corrected as shown below:

Column 6, line 28, delete "and" after the word "Fig. 2;"

Column 6, line 33, "." should read --;--

Column 11, line 23, insert --.-- after the word "edge"

Column 16, line 65, "from-said" should read --from said--

Column 16, line 65, "and-beyond" should read --and beyond--

Signed and Sealed this

Eighteenth Day of October, 1994

Attest:

BRUCE LEHMAN

Attesting Officer

Commissioner of Patents and Trademarks